United States Patent [19]

Chung

[11] 4,236,040
[45] Nov. 25, 1980

[54] SOUND INTENSITY METER

[75] Inventor: Jing-yau Chung, Troy, Mich.

[73] Assignee: General Motors Corporation, Detroit, Mich.

[21] Appl. No.: 934,364

[22] Filed: Aug. 17, 1978

[51] Int. Cl.³ .......................................... G01H 11/00
[52] U.S. Cl. ................................. 179/1 MN; 73/646
[58] Field of Search .................. 179/1 MN, 1 N, 1 P, 179/1 DM; 73/646, 645, 647

[56] References Cited

U.S. PATENT DOCUMENTS

| | | | |
|---|---|---|---|
| 1,892,644 | 12/1932 | Olson | 73/647 |
| 1,892,646 | 12/1932 | Wolff | 73/647 |
| 2,836,656 | 5/1958 | Schultz | 73/647 |
| 3,057,960 | 10/1962 | Kaiser | 179/1 P |
| 3,794,766 | 2/1974 | Cox et al. | 179/1 P |
| 4,061,041 | 12/1977 | Fletcher et al. | 73/646 |

FOREIGN PATENT DOCUMENTS

| | | | |
|---|---|---|---|
| 2435362 | 2/1976 | Fed. Rep. of Germany | 73/647 |
| 489985 | 1/1976 | U.S.S.R. | 73/645 |

OTHER PUBLICATIONS

T.J. Schultz; "Acoustic Wattmeter"; The Journal of the Acoustical Society of America; vol. 28, No. 4; Jul. 1956; pp. 693–699.
F. Fahy; "Measurement of Acoustic Intensity Using the Cross-Spectral Density of Two Microphones"; Journal of Acoustics Society of America; vol. 64, No. 4; Oct. 1977; pp. 1057–1059.
F. Fahy; "A Technique for Measuring Sound Intensity With a Sound Level Meter"; Noise Control Engineering; Nov./Dec. 1977; vol. 9, No. 3; pp. 155–162.

Primary Examiner—Bernard Konick
Assistant Examiner—Randall P. Myers
Attorney, Agent, or Firm—Warren D. Hill

[57] ABSTRACT

Acoustic intensity is measured by a pair of closely spaced microphones aligned in a given direction. One microphone is connected directly to an integrator the output of which is connected to a multiplier while the other microphone is connected directly to the multiplier. The multiplier output is proportional to the imaginary part of the cross-spectrum of the two microphone signals which when time averaged represents the absolute value of the sound intensity in the given direction if the microphone systems are properly phased matched.

2 Claims, 1 Drawing Figure

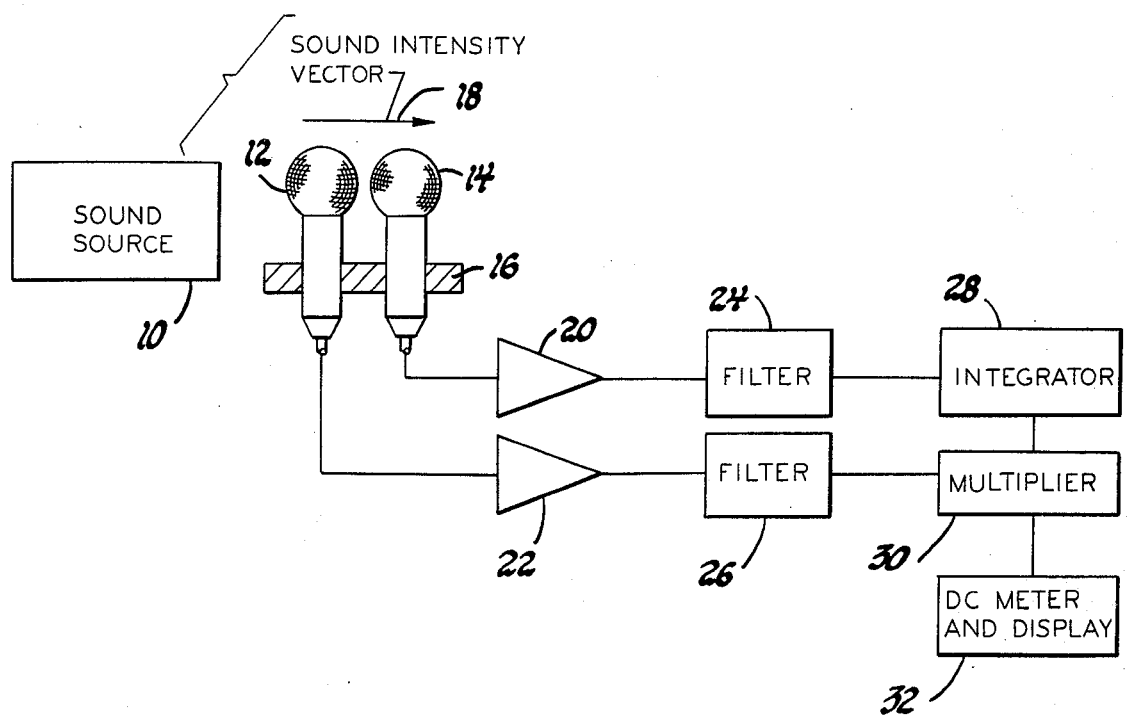

SOUND INTENSITY METER

This invention relates to method and apparatus for measuring sound intensity and particularly to such a method and apparatus which is based on the measurement of the cross-spectrum of signals from two closely spaced microphones.

The acoustic intensity at a point in a sound field is the time average rate of flow of acoustical energy crossing a surface of unit area in a given direction. Intensity is thus a vector quantity and the intensity in a given direction is the time averaged product of acoustic pressure and the acoustic velocity component in that given direction.

Intensity measurements have a number of important applications. For example, measurements of the acoustic intensity throughout a sound field will permit tracing the flow of acoustic energy within the field and hence to determine where the sound comes from and where it is going. Also, when intensity normal to a hypothetical surface surrounding a source is integrated over that surface, the result is a quantity often needed in noise control engineering; namely, the total sound power of the source. In another important application if intensity measurements are performed in the near field very close to a distributed source, they give the contribution of each part of the surface of the source to the total sound radiation and hence can identify and rank the principle radiating regions of the source.

In the past, measurements of acoustic intensity have been far from routine because the pressure velocity product is very difficult to measure accurately. Various methods and instrumentation have been proposed to accomplish this but unfortunately none of them have proved generally reliable in nonlaboratory applications. Typically, the shortcomings involve overly stringent calibration requirements and expensive special purpose equipment. In particular, previous approaches have required overly complicated circuitry, instrumentation and data analysis.

Conventionally, the magnitude of the sound intensity is evaluated in the far field using the mean square pressure technique and is not applicable to usages in the near field. There is, therefore, a need for an accurate practical method and apparatus for measuring acoustic intensity which can be used in the near field or under any arbitrary acoustic conditions.

It is, therefore, an object of this invention to provide a method and apparatus for measuring sound intensity in the near field or far field and which is accurate and of practical use in a nonlaboratory environment.

It is a further object of the invention to provide such a method and apparatus which requires only simple calibration.

The method of the invention is carried out by placing two microphones at a given location spaced in the direction in which the sound intensity is to be measured, integrating the signal from one microphone, multiplying the signal from the other microphone with the integrated signal and time averaging the product to produce a resultant proportional to the imaginary part of the cross-spectrum between the two microphone signals which represents the absolute value of the sound intensity in a given direction.

The apparatus of the invention is carried out by providing a pair of microphones spaced apart for placement at the desired location, an integrator circuit connected to one of the microphones, and a multiplier circuit connected to the other microphone as well as to the integrator output to provide a product which when displayed by a time averaging meter represents the sound intensity in the direction of the microphone alignment.

The above and other advantages will be made more apparent from the following specification taken in conjunction with the accompanying drawing which is a block diagram of the circuit used in the sound intensity measuring apparatus according to the invention.

It has been shown mathematically that the sound intensity is obtained from the imaginary part of the cross-spectrum between the signals from two pressure sensors which are closely spaced or $$|I| = \frac{Im\{G12\}}{\rho\omega\Delta r},$$

Where $|I|$ equals the magnitude of the sound intensity, Im equals imaginary part, $G_{12}$ equals the cross-spectrum between two acoustical pressures as measured by two spaced microphones, $\rho$ equals density of air, $\omega$ equals the angular frequency of each sound component and $\Delta r$ equals the microphone separation distance. It has earlier been proposed to obtain the quantity expressed by this equation given the two microphone signals by a method including a Fourier analysis of the signals. It is here recognized that the same quantity can be obtained by a simpler method and with less complicated equipment. Specifically, it is proposed here to integrate the signal from one microphone and multiply that integrated signal with the signal from the other microphone. Simply multiplying the two microphone signals provides the real part of the cross-spectrum $G_{12}$ of the signals. Integrating one of the signals prior to multiplication has the effect of shifting each frequency component of that signal by 90° relative to its angular frequency and further divides each frequency component of the signal by its angular frequency $\omega$. Because of the 90° phase shift of the one signal and the introduced scale factor of $1/\omega$, the product of the two signals represents the imaginary part of the cross-spectrum divided by the angular frequency or $Im\{G_{12}\}/\omega$. Since the remaining elements of the sound intensity equation, that is, the air density and the microphone separation are constant for a given measurement, the output of the multiplier is proportional to the sound intensity.

The drawing depicts a block representing a sound source 10. A pair of microphones 12 and 14 in either the near field or the far field of the sound source are supported in a holder 16 at a fixed spacing $\Delta r$. As indicated by an arrow 18, the microphones are spaced in a direction to measure a sound intensity vector in that same direction. The microphone outputs are connected to separate channels, each comprising amplifiers 20 and 22 and filters 24 and 26, respectively. The amplifiers and filters are phase-matched as closely as possible using selected components in all the frequency sensitive networks. The amplifiers can be set for gain factors of 1,000, 31.6 or 1 (30 db steps) to accommodate various input voltage levels. Each filter block contains a two-pole high pass filter and a two-pole low pass filter. The high pass cutoff frequencies can be set to either 400 to 800 hertz. The low pass cutoff frequencies can be set to either 2 kilohertz or 6 kilohertz. These filter parameters are selected for an application where the sound source 10 is an automotive engine. Any switching of gains or filter cutoff frequencies is automatically done identically in both channels. The output of the filter 24 is connected to an integrator 28. The integrator acts on the signal from the filter 24 with a gain of $2,500/j\omega$. In other words, the frequency band passed by the filter, where $\omega$ is the rotational frequency and $1/j$ represents a 90° phase lag. The outputs of the filter 26 and the integrator 28 are fed to the input of the multiplier 30 and the product therefrom is fed to an output meter 32 comprising a DC meter and display. Preferably, the DC averaging time is approximately 250 milliseconds. It will thus be seen that the apparatus carries out the method of the invention which comprises integrating the output of one microphone and multiplying the integrated signal by the signal from the other microphone so that the product equals the imaginary part of the cross-spectrum divided by the angular frequency of the two microphone signals which product is time averaged to yield a value proportional to the sound intensity vector in the direction of the microphone spacing.

It will thus be seen that the method of the invention is readily implemented by apparatus which is not overly complex, is readily calibrated and which is practical to use even in nonlaboratory applications.

The embodiments of the invention in which an exclusive property or privilege is claimed are defined as follows:

1. A method of measuring the magnitude of sound intensity in a given direction at a given location of sound comprising a plurality of frequency components comprising the steps of placing at the given location two microphones slightly spaced in the given direction for providing respective electrical signals representing acoustic pressures measured at the microphones, integrating the electrical signal from one microphone to obtain an integrated signal in which each frequency component is approximately phase shifted by 90° and divided by a scale factor proportional to the angular frequency, and multiplying the electrical signal from the other microphone by the integrated signal to produce a resultant signal proportional to the imaginary part of the cross-spectrum between the two electrical signals and time averaging the resultant signal to produce an output which represents the absolute value of the sound intensity in the given direction.

2. An apparatus for measuring the magnitude of sound intensity in a given direction at a given location comprising a pair of microphones mounted in spaced relationship for placement at the given location and spaced in the given direction for providing respective electrical signals representing acoustic pressures measured at the microphones, an electronic processing circuit including a multiplier connected by a conductor to one of the microphones for supplying one of said signals representative of acoustic pressures to said multiplier and and integrator having its input connected by another conductor to the other of the microphones for supplying the other of said signals representative of acoustic pressures to said integrator and its output connected to the multiplier for producing a multiplier output proportional to the imaginary part of the cross-spectrum between said electrical signals, the microphones and their associated conductors being selected to minimize phase mismatch, and means for time averaging the multiplier output whereby the averaged multiplier output is proportional to the absolute value of the second intensity in the given direction.

* * * * *